Figure 1:
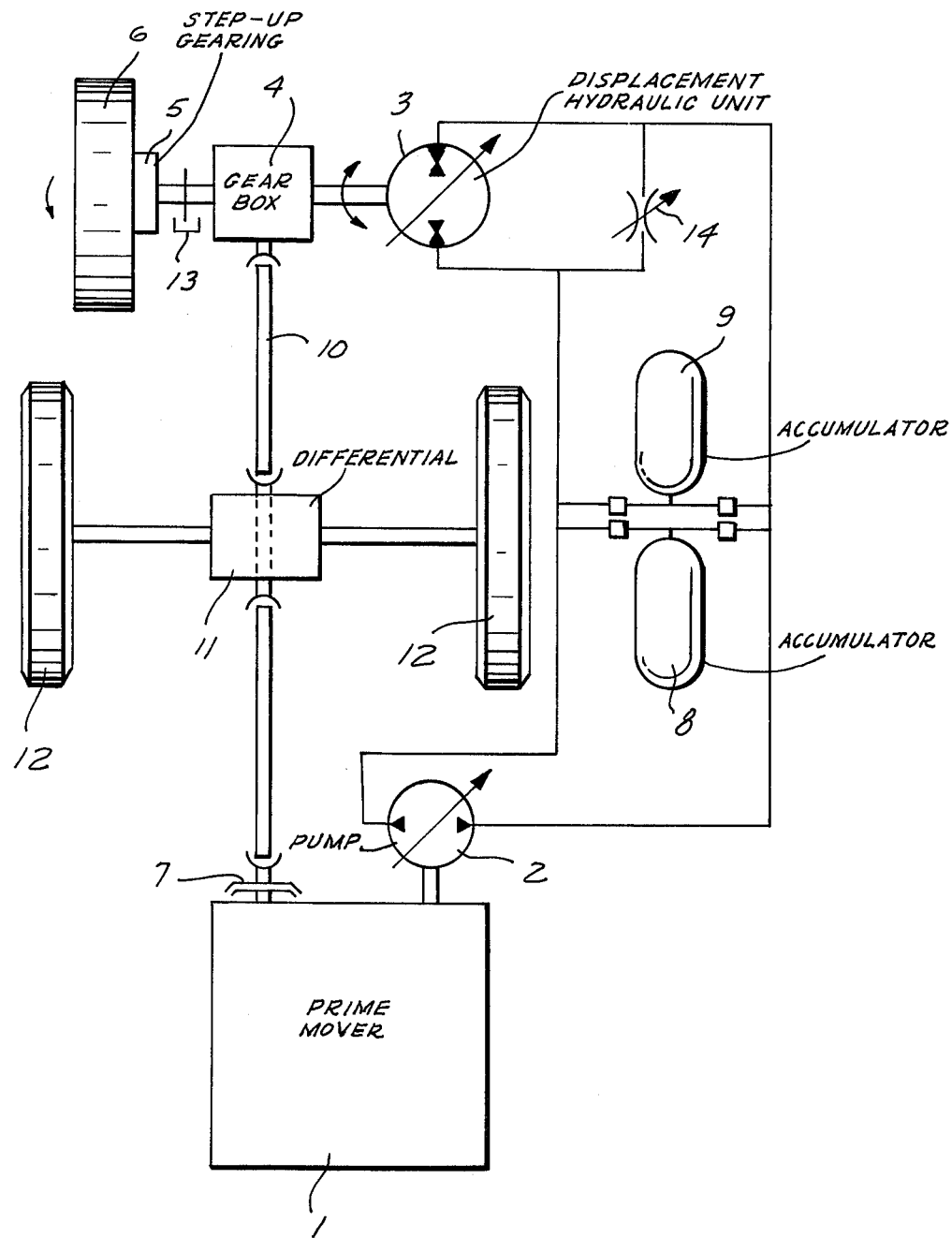

United States Patent [19]
Besel et al.

[11] 4,098,144
[45] Jul. 4, 1978

[54] DRIVE ASSEMBLY WITH ENERGY ACCUMULATOR

[75] Inventors: Gunter Besel; Karl Nikolaus Regar, both of Munich, Fed. Rep. of Germany

[73] Assignee: Maschinenfabrik-Augsburg-Nurnberg Aktiengesellschaft, Munich, Fed. Rep. of Germany

[21] Appl. No.: 670,590

[22] Filed: Mar. 26, 1976

[30] Foreign Application Priority Data

Apr. 7, 1975 [DE] Fed. Rep. of Germany ....... 2515048

[51] Int. Cl.² .............................................. B60K 9/04
[52] U.S. Cl. .................................... 74/687; 74/686; 180/54 R; 180/65 A; 180/66 R
[58] Field of Search ................. 74/661, 677, 686, 687, 74/710.5; 180/54 R, 54 C, 65 A, 65 B, 66 R, 66 B, 66 C

[56] References Cited

U.S. PATENT DOCUMENTS

| | | | |
|---|---|---|---|
| 2,763,164 | 9/1956 | Nekutin | 74/687 |
| 3,427,899 | 2/1969 | Gunderson et al. | 74/686 |
| 3,665,788 | 5/1972 | Nyman | 74/687 |
| 3,734,222 | 5/1973 | Bardwick | 180/54 R |
| 3,892,283 | 7/1975 | Johnson | 180/66 R |
| 3,903,696 | 9/1975 | Carman | 180/66 R |
| 3,923,115 | 12/1975 | Helling | 180/65 A |

*Primary Examiner*—Stephen C. Bentley
*Attorney, Agent, or Firm*—Alan H. Levine

[57] ABSTRACT

A drive assembly including a prime mover, a primary energy accumulator, such as a flywheel, and an output shaft. Power distribution means, such as a differential gear arrangement, is provided for connecting the output shaft to both the energy accumulator and the prime mover. A clutch is provided for connecting the prime mover directly to the output shaft. A hydrostatic torque converter is operatively connected between the prime mover and the power distribution means, the torque converter including a hydraulic pump operated by the prime mover, a hydraulic unit in hydraulic circuit with the pump operable as both a pump and a motor, and a buffer energy accumulator connected to the unit. The prime mover may be an internal combustion engine or an electric motor, or the assembly may include both an engine and a motor alternatively connectable to the torque converter and to the output shaft.

11 Claims, 4 Drawing Figures

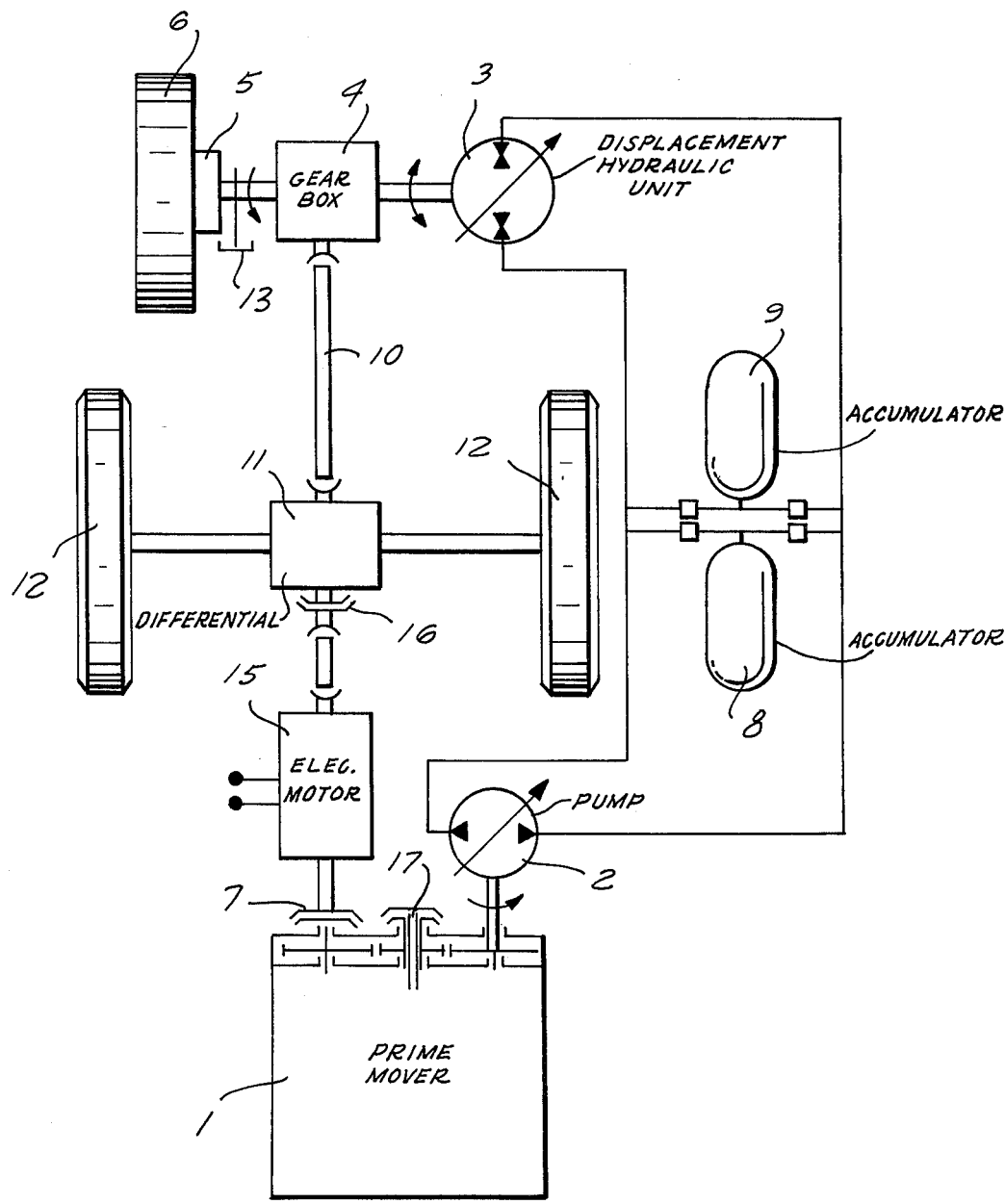

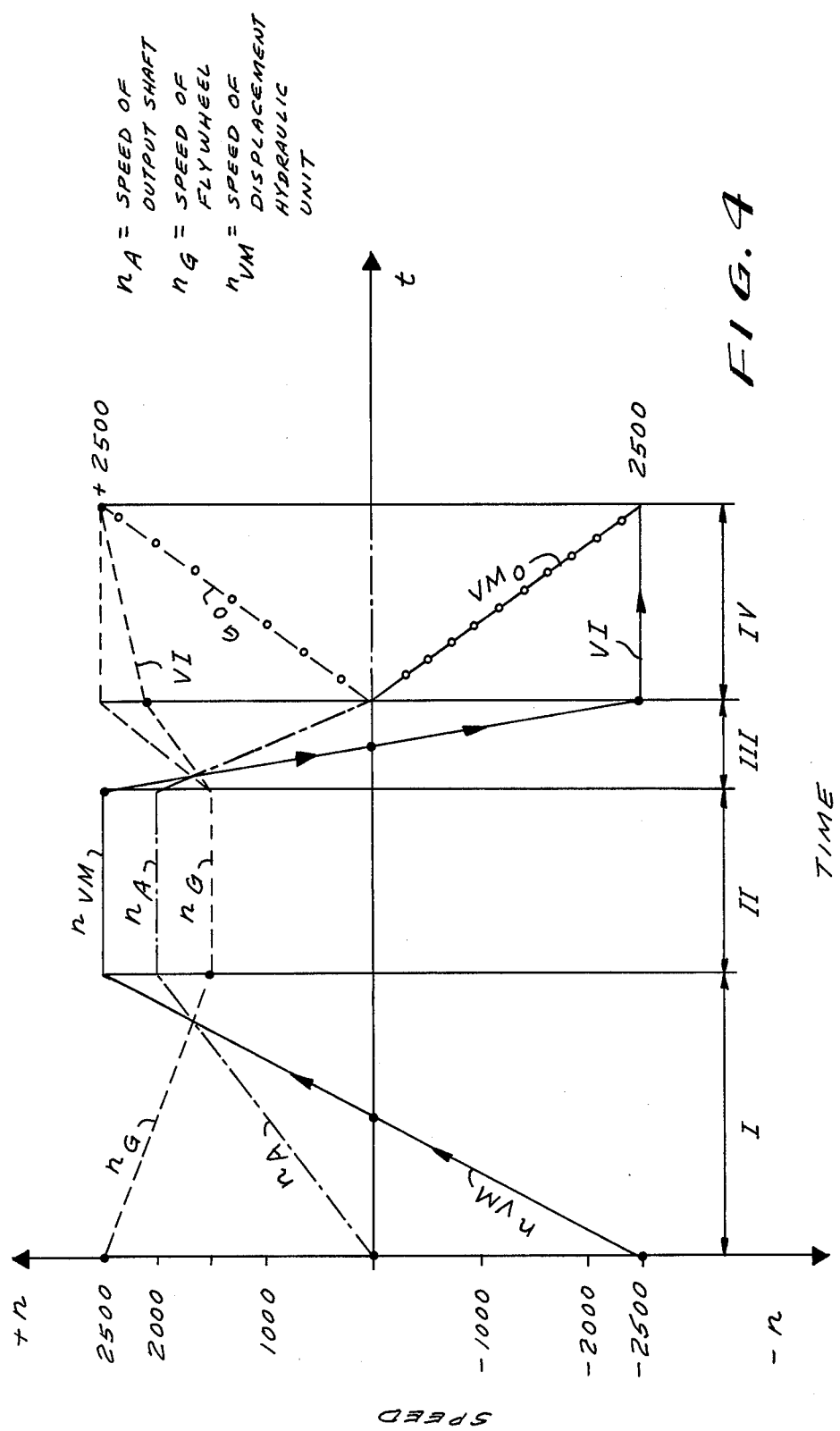

DRIVE ASSEMBLY WITH ENERGY ACCUMULATOR

This invention relates to a drive assembly for machines having variable operating speeds, in particular for road vehicles, with at least one prime mover, a primary energy accumulator in the form of a flywheel, and a power distribution gearbox, by means of which the output shaft of the drive assembly is coupled to the main accumulator and the prime mover.

As is well known, such drive assemblies with a flywheel accumulator, due to the recoverable braking energy which is used to accelerate the vehicles again, permit considerably smaller prime movers to be installed for a comparable acceleration performance. However, a problem arises in that a shaft which is joined to the wheels of the vehicle has to slow down because of the braking effect, while the flywheel has to be accelerated by means of the extracted brake energy. When the stored-up braking energy is released to accelerate the vehicle, the reverse situation applies. Because of the opposed behaviour of the running gear and the flywheel in terms of speed, it has been necessary up to the present to transform the braking energy into electrical energy, by means for example of an electric generator, and then channel the electrical energy to an electric drive system for the flywheel, the result being a relatively low degree of efficiency. In the opposite case, when the energy is transmitted from the flywheel to the vehicle, this low efficiency is again present, so that altogether a correspondingly poor total efficiency resulted. A further disadvantage was the fact that a high proportion of energy had to be fed through the electric generator and electric motor, so that vehicles with flywheel accumulators incorporated very high deadweight, not merely because of the flywheel mass itself but also because of the correspondingly large electrical transmission units.

In order to keep the losses small during energy transmission from a vehicle, or the prime mover installed in it, to the flywheel and from there back again to the vehicle, it was also suggested that two machines working in four quadrant operation should be joined to the power distribution gearbox and that they should be coupled by a buffer device. By doing this, it was possible to channel a greater part of the energy (braking energy) released from the vehicle directly to the flywheel accumulator with good efficiency and to only have to choose the route via two machines working in four quadrant operation for the transmission of a smaller portion of the energy. The disadvantage with this proposed arrangement, however, remained the necessity of a change-over gear to obtain useful efficiency, and also the relatively high weight of the machines to be installed, which altogether make the deadweight of the vehicle too high.

An object of the present invention, therefore, is to create a suitable type of drive assembly for machines having variable operating speeds, in particular for road vehicles, in which the accumulation and release of braking energy can be achieved with relatively simple construction and comparatively high efficiency, and which can also cover the highly differing load requirements of the machine to be driven, both relative to torque and to rotational speed.

The objective is achieved by the invention, by directly linking the prime mover, via a clutch, to the output shaft, and connecting the prime mover to the power distribution gearbox via a hydrostatic torque converter group consisting of an adjustable pump and a further displacement hydraulic unit operable in a four quadrant manner, the displacement hydraulic unit being connectable to a buffer accumulator.

A fundamental advantage of the drive assembly covered by the invention over known arrangements is that the efficiency of the power transmission from the prime mover to the machine is considerably improved because the prime mover can be linked directly to the output shaft, this being possible without any further intermediate assemblies, over broad operating ranges. A simple method of control, which functions over a wide range with a high degree of efficiency, is achieved for the drive assembly through the hydrostatic torque converter group which works together with the buffer accumulator. A further advantage over known drive assemblies with accumulator devices for recovering braking energy is in the comparatively simple arrangement of the system covered by the invention.

In one configuration of the invention, the power distribution gearbox is a planetary differential gear. When such a familiar design of a generally proved differential gear is used, not only can the production costs of the drive assembly be kept low, but by the use of such a generally well-known gearbox the drive assembly is made easier to service. Also, due to its spur teeth, the efficiency of planetary gearing is somewhat greater than, for example, that of a bevel-gear differential, which alternatively could likewise be used for the power distribution gearbox.

In a further configuration of the invention, a planetary gear is to be connected between the power distribution gearbox and the flywheel. The installation of a planetary gear in this position does not merely have the advantage that the gear ratio between the flywheel, on the one hand, and the machine or prime mover, on the other, can be easily changed, but also that the flywheel can quite simply be disconnected from the whole system by operating the locking brakes to be provided in the planetary gear.

In a further configuration of the invention, the buffer accumulator is a conventional bladder accumulator. In another embodiment of the invention, the buffer accumulator is split up into separate accumulators from which auxiliary units of the machine are driven. One of these individual accumulators, for example, can be used exclusively for controlling the drive assembly itself, to momentarily meet, for example, the vehicle's peak energy requirements, while other separate accumulators can serve to operate the service brakes, the hydraulic steering, the hydropneumatic suspension of the vehicle, the doors, and other devices.

In a further embodiment of the invention, the flywheel is capable of being connected to and disconnected from the drive assembly be means of locking brakes in the planetary gearing. This makes it possible for the flywheel, in every driving condition and irrespective of its own speed, to maintain its energy content unchanged through appropriate operation of these locking brakes. One such driving condition, for instance, may be operation of the vehicle in reverse.

In order to meet special demands, for example, the purely hydrostatic operation of the vehicle at high speeds, the differential gear used as the power distribution gearbox has, according to a further embodiment of the invention, a differential lock. By means of such a differential lock, the gear ratio between the output shaft and the displacement hydraulic unit working in a four-quadrant operation can be changed by a factor of 2.

Another disadvantageous configuration of the invention involves the prime mover being an electric motor. A drive assembly conceived in this way is especially suitable for urban transport, such as trams and underground and suburban ground-level trains.

Finally, in a further embodiment of the invention, the drive assembly has two prime movers, one of which is an internal combustion engine and the other an electric motor. The machine can then be driven optionally either by the internal combustion engine or, free from exhaust, by the electric motor when suitable gearing is used to connect both these prime movers. This arrangement may be of particular advantage where a municipal means of transport is to be operated.

Further advantageous embodiments of the invention are illustrated in the accompanying drawings which show some practical examples.

Figure 2:
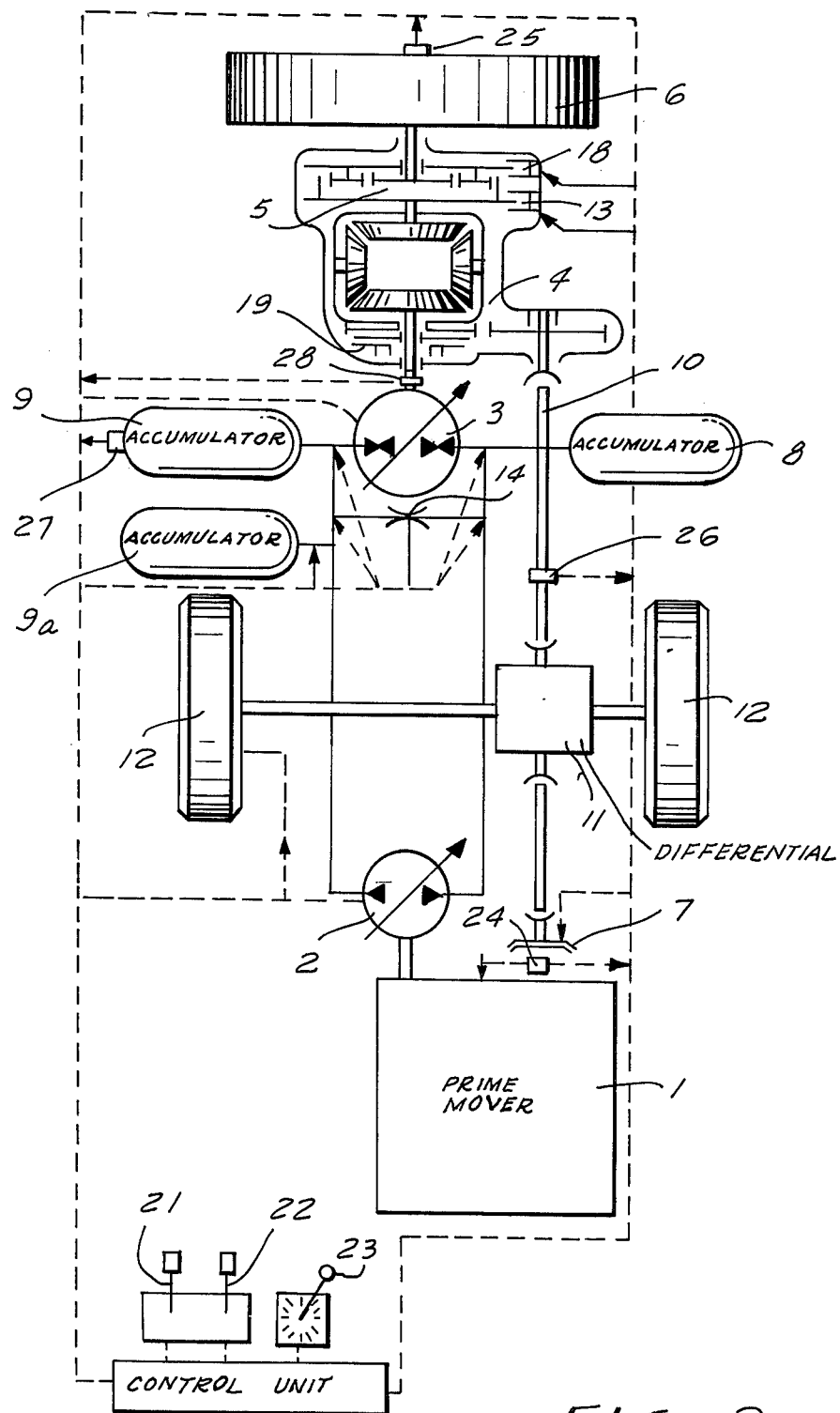

In the drawings:

FIG. 1 is a schematic diagram of a first version of a drive assembly covered by the invention showing the basic layout of the various units, FIG. 2 is a schematic diagram of an arrangement similar to FIG. 1, in which a bevel-gear differential of the usual type is employed as the power distribution gearbox, and in which dashed lines show lines of action to illustrate the control system of the drive assembly, FIG. 3 is a schematic diagram of an arrangement with two prime movers, one of which is an internal combustion engine, and the other an electric motor, and FIG. 4 is a time/speed graph in which the rpm figures for the output shaft, the flywheel, and the displacement hydraulic unit are recorded for a complete driving cycle.

In the schematic representation of a drive assembly according to the invention and shown in FIG. 1, the drive wheels 12 of a vehicle are driven via a differential gear 11 by a divided shaft, which is an output shaft 10 of the drive assembly and which is on both sides of the differential 11. At one end, the output shaft 10 is connected via a clutch 7 to the prime mover 1, while the other end of the output-shaft 10 is linked with a power distribution gearbox 4. The power distribution gearbox 4, has two other output shafts, one of which is linked to the flywheel 6 via a step-up gearing 5, and the other of which is coupled to a displacement hydraulic unit 3 which is operable in four quadrant operation, i.e., as a motor and as a pump in both directions of rotation. The displacement hydraulic unit 3 is operable in both senses of rotation, either as a pump or as a motor, and, in addition, the delivery rate is adjustable. The displacement hydraulic unit 3 works together with a pump 2, driven by the prime mover 1, the delivery rate of which is likewise adjustable. Normally, this interaction between the pump 2 and the displacement hydraulic unit 3 is such that the pump 2 is driven by the prime mover 1, and then, in turn, drives the displacement hydraulic unit 3 as a motor by means of the delivered fluid flow.

In addition, the displacement hydraulic unit 3 is connected to a buffer accumulator which, in the example illustrated, comprises a high pressure accumulator 9 and a low pressure accumulator 8. The high pressure accumulator 9 is a conventional bladder accumulator, the lowest pressure level of which is considerably higher than the pressure level of the low pressure accumulator 8. Finally, a means is provided of short-circuiting the displacement hydraulic unit 3, the short circuit containing a constriction 14. In order to be able to operate the vehicle completely independently of the flywheel 6, a locking brake 13 is mounted in the shaft linking the power distribution gearbox 4 to the step-up gearing 5.

The embodiment shown in FIG. 2 is, in general, the same as that represented in FIG. 1. A control scheme is schematically represented by dashed lines, while individual components corresponding to those in FIG. 1, such as, the power distribution gearbox 4 and the step-up gearing 5 are shown in detail. The drive assembly is controlled by an accelerator pedal 21, a brake pedal 22, and a preselector level 23, having the positions "Start", "Drive", "Park", and "Reverse".

The power distribution gearbox 4 takes the form of a bevelgear differential gearbox which is provided with a differential lock 19, by means of which the bevel-gear input shaft coming from the displacement hydraulic unit 3 can be rigidly coupled to the bevel gearbox. The step-up gearing 5 takes the form of a planetary gear, there being a locking brake 13 for the ring gear and a locking brake 18 for the planetary carrier.

Finally, compared to FIG. 1, instead of one high pressure accumulator 9, there are two high pressure accumulators 9 and 9a, the accumulator 9a being used mainly to operate the auxiliary units of the vehicle to be driven. In order to enable a driver to operate the drive assembly, such operation being largely the same as that for a conventional road vehicle, control is semi-automatic, various speed and pressure sensors being provided for the purpose. A speed sensor 24 is provided to feed the speed of the prime mover 1 into the control circuit, a speed sensor 25 feeds in the speed of the flywheel 6, and a speed sensor 26 feeds in the speed of the output shaft 10. Finally, a pressure sensor 27 is attached to the high-pressure accumulator 9, pressures recorded being fed into the control circuit to serve as the factor for actuating appropriate inlet and outlet valves for the pressure accumulator 9.

The way in which a drive assembly according to the invention functions, based on the arrangement shown in FIG. 2, is described below, particular reference being made to the stages which cover a driving cycle, namely, acceleration, cruising, braking, and decelerating to a stop, as they are shown in the time/speed graph in FIG. 4.

Starting the prime mover at the beginning of operation and charging the flywheel accumulator:

The pre-selector lever 23 is moved to the position "Start", as a result of which the clutch 7 on the prime mover 1 is disengaged. The prime mover 1 is started by means of an ordinary starter motor. When the prime mover 1 has reached a predetermined speed, the speed sensor 24 feeds a control signal into the control circuit, whereby the locking brake 13 in the planetary gear 5 is released and the locking brake 18 is applied. At the same time, the valves of the high pressure accumulator 9 and of the constriction 14 are closed by this signal and the pump 2 is put on maximum delivery, with the result that the displacement hydraulic unit 3 is driven as a motor. Unit 3 drives the flywheel 6 (see the zero-marked curves $VM_o$ and $G_o$ in stage IV of FIG. 4) via the power distribution gearbox 4 and the planetary gearing 5. As the rpm of the prime mover 1, which is measured by the speed sensor 24 and fed as a signal into the control circuit, increases, the absorption capacity of the displacement hydraulic unit 3 working as a motor is adjusted so that its speed and, consequently, the speed of the flywheel 6 are increased to a maximum permissible figure. When the flywheel 6 has reached its predetermined maximum speed (in FIG. 4 2500 r.p.m.), which is picked up by the speed sensor 25 and fed into the control circuit, both the pump 2 and the displacement hydraulic unit 3 are put on zero delivery and the prime mover 1 on idle.

Driving off: (see stage 1 in FIG. 4)

In order to start up the vehicle, the preselector lever 23 is first moved into the position "Drive", whereby a valve of the high pressure accumulator 9 is opened and simultaneously the vehicle's parking brake is released. By means of the accelerator pedal 21, the displacement hydraulic unit 3 is switched to pump operation. As a result, there is an increase in torque at the point where drive is transmitted to the displacement hydraulic unit 3, and at the same time torque on the output shaft of the power distribution gearbox 4 to the output shaft 10 increases. Energy is transmitted from the flywheel 6 via the differential gear 4, the output shaft 10, and the differential gear 11 to the drive wheels 12, which then set the vehicle in motion. As the speed of the shaft 10 increases and the high pressure accumulator 9 is filled, the speed of the flywheel 6 drops, thereby releasing energy. This is used for accelerating the vehicle and loading the high-pressure accumulator. Due to resistance in the high pressure accumulator 9 and at the displacement hydraulic unit 3, the rotational speed of the displacement hydraulic unit falls to zero, with the speed of the output shaft 10 increasing correspondingly, and the displacement hydraulic unit reverses its sense of rotation and starts working as a motor, whereby its speed increases again. Its energy for operation as a motor is taken from the high-pressure accumulator 9, which is thereby emptied again. This energy is also used to accelerate the vehicle.

As soon as the rotational speed of the output shaft 10 has reached the idling speed of the prime mover, the clutch 7 is engaged by a corresponding signal from the sensor 26, so that power can now be transmitted directly from the prime mover 1 to the output shaft 10, and from there to the differential gear 11 and the drive wheels 12 of the vehicle.

When the speed of the vehicle reaches a predetermined value (e.g. 50 km/h) and the speed of the output shaft 10 reaches a corresponding value, the sensor 26 feeds the appropriate signal into the control circuit for switching the displacement hydraulic unit 3 to zero delivery, whereby the flywheel 6 runs under no load at a constant speed without releasing any energy. In this driving condition, the energy required for overcoming tractive resistance is normally supplied exclusively by the prime mover 1, directly to the output shaft via the clutch 7. This driving condition corresponds to stage II in FIG. 4.

Braking:

Depressing the brake pedal 22 has the effect of disengaging the clutch 7, switching the prime mover 1 to idle, and switching the displacement hydraulic unit 3 to pump operation. At the same time, when the brake pedal is depressed, the effect of the preselector lever 23 (still at position "Drive") is overridden. The brake pedal 22 acts to control the delivery rate of the displacement hydraulic unit 3 (which is switched to pumping) in such a way that, as the brake pedal 22 is depressed further, the delivery rate at the displacement hydraulic unit 3 is increased and with it the resistance in the drive goes up correspondingly, increasing as well the braking power on the output shaft 10 and on the wheels 12. As the rotational speed of the output shaft 10 decreases, the speed of the flywheel 6 increases, by which means braking energy is accumulated. Likewise, the rotational speed of the displacement hydraulic unit 3 (switched to pumping) decreases when the ratio of the speed of the vehicle/rpm of the output shaft 10 falls. When the rotational speed has reached zero, the sense of rotation of the displacement hydraulic unit 3 is reversed and it works as a motor, whereby the energy needed is taken from the high pressure accumulator 9 and channelled to the flywheel 6. As soon as the vehicle comes to a standstill, the preselector lever 23 is moved to the position "Park", whereby the parking brake (not shown) of the vehicle is applied and the displacement hydraulic unit 3 switched to zero delivery.

If the brake pedal 23 is released before the vehicle has come to a standstill, the preselector lever 23 is still at the position "Drive", with the result that the overriding effect on it of the brake pedal is cancelled. When the accelerator pedal 21 is operated again, the following happens:

If the rotational speed of the output shaft 10 is less than or, at the most, equal to the idling speed of the prime mover 1, the displacement hydraulic unit 3 is switched to pump operation and, depending upon the position of the accelerator pedal, a corresponding tractive force applied to the wheels 12.

If the rotational speed of the output shaft 10 is greater than the idling speed of the prime mover 1, the speed of the prime mover 1 is raised to the point at which it reaches the speed of the output shaft 10 (acceleration). At this point, the clutch 7 is engaged and the displacement hydraulic unit 3 is switched to pump or motor operation with an appropriate delivery rate, as long as the actual speed of the vehicle is less than the predetermined maximum speed figure.

In the case of an emergency stop, when the rate of deceleration has to be so great that the braking energy released cannot be stored quickly enough, an auxiliary lever 29 is provided on the brake pedal 22 which actuates a conventional service brake on the vehicle when the brake pedal 22 is fully depressed. This additional conventional service brake is also used when the vehicle is to be slowed down from a high speed and the storage capacity of the flywheel 6 is not sufficient to absorb the braking energy released by the fast moving vehicle.

Vehicle at standstill:

If the vehicle has come to a standstill at a bus stop, traffic light, or in a traffic jam, and the flywheel has not reached its maximum speed as a result of the braking energy, the flywheel can be boosted by means of the prime mover 1 with the preselector lever 23 in the position "Park" (see curves VI in stage IV of FIG. 4). This boost comes about when the speed sensor 25 for the flywheel 6 signals the control circuit that the maximum speed has not been reached, causing simultaneously the high pressure accumulator 9 to close, the pump 2 to be set to delivery, and the displacement hydraulic unit 3 to be switched to motor operation. Finally, in this switch position the speed of the prime mover 1 is increased. The flywheel 6 can then be boosted by the prime mover 1 via the pump 2, the displacement hydraulic unit 3, the differential gear 4, and the step-up gearing 5. As soon as the maximum permissible speed of the flywheel 6 is reached (in FIG. 4, 2500 r.p.m.), the pump 2 and the displacement hydraulic unit 3 are switched to zero delivery and the prime mover to idle, indirectly, by means of the speed sensor 25.

If, before the energy charging operation is completed, the driver is obliged to move on, he brings the preselector lever 23 into the position "Drive" and can then operate the accelerator pedal 21.

When the flywheel 6 is at a standstill, driving-off, accelerating, and cruising are possible if the flywheel shaft is locked by the locking brake 13 and the clutch 7 is disengaged. The prime mover 1 drives the output shaft 10 via the pump 2, the displacement hydraulic unit 3, and the gearbox 4. When the output shaft 10 is turning at a predetermined speed, the pump 2 is switched to zero delivery, the clutch 7 engaged, and all the energy from the prime mover 1 is transmitted directly to the output shaft 10 by mechanical means.

Reverse operation:

For reverse operation, the preselector lever 23 is moved into the position "Reverse", whereby the high pressure accumulator 9 is closed and the displacement hydraulic unit 3 is brought into the sense of rotation needed for reverse movement by the actuation of hydraulic valves (not shown in detail). When the accelerator pedal 21 is operated, the pump 2 is switched to delivery, with the result that the vehicle, powered by the prime mover 1, moves backwards.

The embodiment shown in FIG. 3 of the drive assembly according to the invention is characterized by the fact that the vehicle can optionally be powered either by an internal combustion engine 1 or, without giving off any exhaust fumes, by means of an electric motor 15 (e.g. as a trolley bus). To be driven by the internal combustion engine, the vehicle is operated, with the clutch 17 engaged and the clutch 7 disengaged, via the pump 2 and without the flywheel 6 in use. Having reached a specific speed, the vehicle can also be driven directly by the internal combustion engine once the clutch 7 is engaged, the electric motor 15 being turned freely.

For driving with a total absence of exhaust gases, the clutch 17 is disengaged, the internal combustion engine 1 turned off, clutch 7 engaged, and a further clutch 16 (between the electric motor 15 and the output shaft 10) disengaged. The electric motor 15 then drives the pump 2, the necessary energy being fed, for instance, from an overhead line. When the vehicle reaches a predetermined speed, pump 2 is switched to zero delivery and the clutch 16 engaged. The vehicle can then be powered purely electrically. The flywheel 6 coupling capability is fully maintained thereby, so that, as described above, braking energy can be stored up at all times.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A drive assembly for a machine having variable operating speeds, comprising
  (a) a prime mover (1),
  (b) a primary energy accumulator (6),
  (c) an output shaft (10)
  (d) a power distribution means (4) for connecting said output shaft to both said primary energy accumulator and said prime mover,
  (e) clutch means (7) for directly connecting said prime mover to said output shaft, and
  (f) a hydrostatic torque converter operatively connected between said prime mover and said power distribution means, said converter including
    (I) a hydraulic pump (2) operable by said prime mover,
    (II) a displacement hydraulic unit (3) operable as a pump or as a motor in each of its directions of rotation,
    (III) means connecting said displacement hydraulic unit to said power distribution means,
    (IV) hydraulic circuit means interconnecting said pump and said displacement hydraulic unit, and
    (V) a buffer energy accumulator (9) hydraulically connected to said displacement hydraulic unit, said buffer energy accumulator communicating with said power distribution means only through said displacement hydraulic unit.

2. A drive assembly as defined in claim 1 wherein said primary energy accumulator is a flywheel.

3. A drive assembly as defined in claim 1 wherein said power distribution means comprises a differential gear arrangement.

4. A drive assembly as defined in claim 3 wherein said differential gear arrangement includes a differential lock for rigidly coupling said differential gear arrangement to said displacement hydraulic unit.

5. A drive assembly as defined in claim 1 including a planetary gear arrangement between said primary energy accumulator and said power distribution means.

6. A drive assembly as defined in claim 5 including locking brakes in said planetary gear arrangement for connecting and disconnecting said primary energy accumulator and said power distribution means.

7. A drive assembly as defined in claim 1 wherein said buffer energy accumulator is a bladder accumulator.

8. A drive assembly as defined in claim 1 including a plurality of buffer accumulators, some of said buffer accumulators being employed to operate auxiliary units of the machine.

9. A drive assembly as defined in claim 1 wherein said prime mover is an internal combustion engine.

10. A drive assembly as defined in claim 1 wherein said prime mover is an electric motor.

11. A drive assembly as defined in claim 1 including two prime movers, on being an internal combustion engine and the other being an electric motor, means for alternatively connecting said two prime movers to said hydrostatic torque converter, and for alternatively connecting said two prime movers directly to said output shaft.

* * * * *